Jan. 26, 1960
E. H. POVEY ET AL
2,922,952
HIGH VOLTAGE PHASE MEASUREMENTS
Filed March 10, 1958
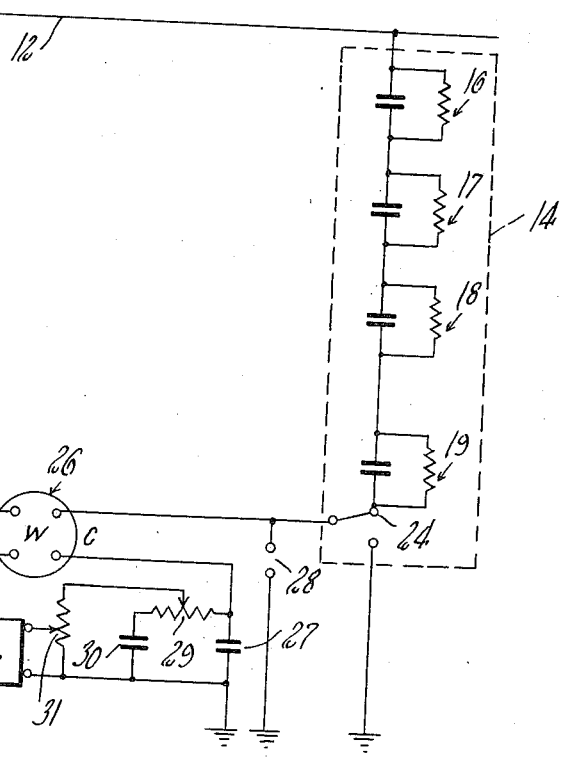
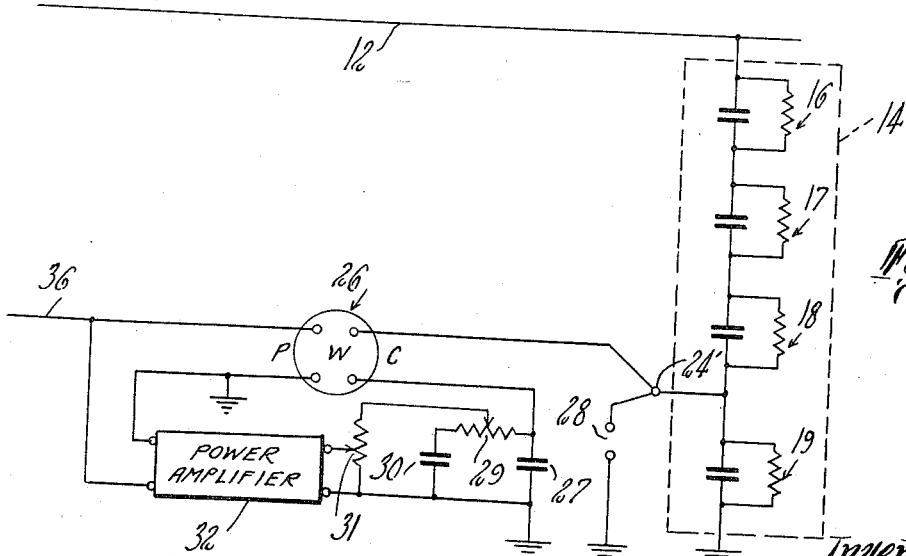
Inventors
Chester L. Dawes
Edmund H. Povey
by Robert S. Toperzer
Atty.

United States Patent Office 2,922,952
Patented Jan. 26, 1960

2,922,952

HIGH VOLTAGE PHASE MEASUREMENTS

Edmund H. Povey, Medford, and Chester L. Dawes, Winchester, Mass., assignors to Doble Engineering Company, Belmont, Mass., a corporation of Massachusetts Application March 10, 1958, Serial No. 720,362

5 Claims. (Cl. 324—83)

This invention relates generally to high voltage electrical systems, and in particular it is concerned with the derivation of phase information and its use in or application to such systems.

In high voltage systems, as in most electrical systems, it is often of importance to obtain information concerning certain of the phase relations that are present under operating conditions. This has presented a considerable problem in the past because of the difficulty of working with high voltage lines while alive in service. The high voltage must be reduced to a low voltage that is safe to handle and apply to phase sensitive apparatus and other measuring or control devices. To obtain the accuracy and stability that is desirable or often necessary, there must be a derived low voltage supply that has a known fixed phase relation to the high voltage line. In addition, the low voltage supply must be capable of delivering power sufficient to operate one or more devices as set forth above.

The usual apparatus employed to provide the required low voltage is a potential transformer, but a potential transformer may not be available at the point at which a phase measurement is desired, and the purchase and installation of such a high voltage potential transforming may be prohibitively expensive. Furthermore, this device has an inherent phase shift as high as 1 or more degrees which is subject to variation due to changes in temperature and loading.

In copending application Serial No. 720,324 filed March 10, 1958, a method and apparatus are disclosed whereby this problem is largely overcome through the provision of a suitable low voltage supply whose phase is caused to have a desired relation to that of the high voltage at any selected point on the system. The most convenient source of low voltage according to the method described in the copending application is a low voltage distribution system supplied by the high voltage line through power transformers. However, local loading on such a distribution system can cause continually varying phase angle differences between the high and low voltages. For this reason, the use of such a low voltage source requires constant adjustment to maintain the desired phase relation.

According to the present invention, the low voltage supply to be brought into a desired phase relation to the high voltage, is controlled both in phase and magnitude by a voltage derived from an impedance device connected directly to the high voltage line. Hence, the low voltage supply is affected only by changes in the high voltage line itself and it is independent of phase changes in a local distribution system which were detrimental to the method described in the copending application. Consequently, by means of the present invention, once the phase and magnitude of the low voltage supply have been correctly adjusted their relation to the high voltage will remain virtually constant.

It is an object of the present invention, therefore, to provide improved apparatus and methods for obtaining a low voltage supply which at all times has a desired phase and magnitude relation to a given high voltage.

The novel features of the invention, together with further objects and advantages thereof, will become more readily apparent from the following detailed description of a preferred embodiment as illustrated in the accompanying drawing.

Fig. 1 is a schematic diagram of the apparatus according to the present invention.

Fig. 2 is a schematic diagram of a modified impedance device suitable for use in the apparatus according to the invention.

With reference now to Figs. 1 and 2, it will be observed that there is connected to a high voltage line 12 an impedance device 14 of known defect angle, such as a coupling capacitor, which has been described in detail in the aforementioned copending application.

Briefly, this device is formed with a relatively large number of capacitance sections of which 16—19 are illustrative, each section consisting of a capacitor and its associated leakage resistance. Together, the sections provide an impedance which is largely capacitive but has a finite measurable deviation or defect relative to a pure capacitance, depending on the total amount of leakage resistance that is present. Ordinarily, the defect angle (or power factor) of a device of this kind is known before installation and usually does not change significantly under normal operating conditions. If, however, the defect angle is not known the device can be taken out of service and measured.

According to the invention as shown by Fig. 1, the low voltage end 24 of the impedance device 14, instead of being connected directly to ground, is connected to ground through a low impedance path consisting of the current coil C of a wattmeter 26 and an impedance element such as capacitor 27. If a low voltage tap 24' is available on the impedance device as shown in Fig. 2, it will often be found preferable to utilize this tap as the point of connection to the current coil, leaving one end of the impedance device grounded. In effect the current coil and capacitor 27 will then be disposed in parallel relation to the remaining one or more capacitance sections such as 19 between the tap and ground. Preferably, there is also provided a protective device or gap 28 between the terminal 24 or tap 24' and ground to insure that the voltage on the current coil does not become dangerously high for any reason. Capacitor 27 has a capacitance value which is very large as compared with that of the individual capacitance sections such as section 19 between tap 24' and ground. Coupled to the capacitor 27 is a phase shifting network consisting of a potentiometer 29 and a capacitor 30. The movable arm of potentiometer 29 connects to one end of a potentiometer 31 having its other end connected to ground. Potentiometer 31 is disposed with its movable arm and grounded end across the input circuit of a power amplifier 32, and controls the gain thereof. Power for the amplifier may be taken from any convenient low-voltage source such as the usual 115-volt outlet or even a battery. The potential coil P of the wattmeter is connected to the output terminals of the power amplifier 32 as is a line 36 and a ground or common lead, respectively.

In the arrangement shown in Fig. 2, nearly all the current in the impedance device 14 is caused to flow through the current coil of the wattmeter, since the combined impedance of the current coil and capacitor 27 is small as compared with that of capacitance section 19. Also, the overall capacitance value of the impedance device 14 will be small as compared with that of capacitor 27. An illustrative value for the impedance of the current coil of the wattmeter is 50 ohms and for the overall capacitance of the impedance device 14 is .0005 microfarad as compared with .01 microfarad for section 19. A preferred value for capacitor 27 is 10 microfarads, for capacitor 30, 2 microfarads, and for potentiometer 29, 100 ohms. It follows, therefore, that the phase of the current in the capacitor 14 will bear substantially the same relation to that of the voltage on line 12 as when the low voltage tap is unused, and that the phase of the current in the current coil of the wattmeter will not be measurably different from that of the capacitor 14.

Conversely, the phase of the voltage applied to the phase shifting network will be displaced from that of the current in the current coil by approximately 90 degrees, which is the same as the phase displacement between the voltage on line 12 and the current in the capacitor 14 neglecting the effect of its leakage resistance. To introduce a like phase shift as is produced by the leakage resistance of the capacitor, the phase shifting network is adjusted until the power loss indicated by the wattmeter is representative of the actual power loss in the impedance device. When this adjustment has been made, the losses in the impedance device will be precisely accounted for, and the phase of the voltage on the line 36 will agree precisely with that of the high voltage on line 12. Similarly, the adjustment can be made so that the phase of the low voltage on line 36 has a desired phase displacement with respect to the high voltage.

The actual power loss may be determined in advance from the well known formula $W = VI \cos \theta$ where W is the power loss in the impedance device, V is the high voltage across the device, I is the total current therein, and $\cos \theta$ is the power factor of the impedance device. An ammeter (not shown) may be connected in series with the current coil of the wattmeter to measure the current. If the overall impedance of the capacitor is known, then, of course a measure of the current therein will provide a basis for calculating the value of the high voltage with a high degree of precision. Conversely, if the value of the high voltage is known, the value of the current can be calculated. The voltage at terminal 24 or tap 24' is equal to a fixed fraction of the voltage on line 12 and the amplifier may be provided with a suitable feed back circuit so that its output voltage always has a fixed relation to its input voltage, or the voltage at terminal, 24 or 24'. Adjustment of potentiometer 31 establishes the desired magnitude relation of these voltages.

Hence, once the phase shifting network has been adjusted according to the foregoing procedure, it follows that the low voltage on the line 36 may be used at will throughout the system to represent with a high degree of accuracy the phase and the magnitude of the high voltage. For example, it can be used for phase sensitive devices, voltmeters, metering, and for operating other devices which depend on voltage. Power amplifiers having a capacity of 100 watts or more are readily available commercially and this is entirely adequate for most measuring purposes. If required, however, power amplifiers can be designed to furnish a still greater amount of power.

Tests to determine the accuracy of the device have been made on a 32-kv. bushing. With a fixed load on line 36 the voltage was varied from its normal value of 32-kv. down to 20-kv. and up to 40-kv. The results are shown in Table 1.

Table 1

| Kv. (approx.) 32 | Phase Angle Change θ (set), minutes | Voltage Ratio Dial 312 |
| --- | --- | --- |
| 20 | 1.0 | 312 |
| 24 | 0.5 | 312 |
| 28 | 0 | 312 |
| 36 | 1.0 | 312 |
| 40 | 2.0 | 312 |

It is significant that there is no measurable change in the ratio of the high to low voltage and a maximum change of only 2 minutes in the phase angle measurements.

Although the invention has been described in connection with the derivation of a single low test or reference voltage, it is contemplated that other voltages be derived for comparison therewith in like manner as described in the foregoing. To this end, phase sensitive devices other than a wattmeter can be used to indicate when phase agreement between the low and high voltages has been obtained, a wattmeter having been used for illustration since it is a type of phase sensitive device whose principles of operation are well known.

Various such modifications that are within the spirit or scope of the invention will, no doubt, occur to those skilled in the art so that the invention should not be deemed to be limited to the details of what has been described herein by way of example, but rather it should be deemed to be limited only by the scope of the appended claims.

What is claimed is:

1. Apparatus for producing a low voltage supply having a given phase angle with reference to an unknown high voltage, said apparatus comprising an impedance device of known defect angle connected to the high voltage to provide a point of relatively low potential related in phase to the high voltage, a phase sensitive device having first and second input circuits and being adapted to provide an indication which is dependent upon the phase difference between signals applied to said input circuits, means to couple said first input circuit between said point of relatively low potential and ground whereby a portion at least of the current in said impedance device is caused to flow through said first input circuit, an adjustable phase shifting network to which is applied at least a portion of the voltage between said point and ground, and a power amplifier coupled between said phase shifting network and said second input circuit to provide the low voltage supply having the given phase angle when by adjustment of said phase shifting network the indication of said phase sensitive device has been caused to represent the combination of said given phase angle and said defect angle.

2. Apparatus for producing a low voltage supply in phase with an unknown high voltage, said apparatus comprising an impedance device of known defect angle connected to the high voltage to provide a point of relatively low potential related in phase to the high voltage, a phase sensitive device having first and second input circuits and being adapted to provide an indication which is dependent upon the phase difference between signals applied to said input circuits, means to couple said first input circuit between said point of relatively low potential and ground whereby a portion at least of the current in said impedance device is caused to flow through said first input circuit, an adjustable phase shifting network to which is applied at least a portion of the voltage between said point and ground, and a power amplifier coupled between said phase shifting network and said second input circuit to provide the low voltage supply which is in phase with the high voltage when by adjustment of said phase shifting network the indication of said phase sensitive device has been caused to represent said defect angle.

3. Apparatus for producing a low voltage supply in phase with an unknown high voltage, said apparatus comprising an impedance device of known power loss connected to the high voltage to provide a point of relatively low potential related in phase to the high voltage, a wattmeter having a current coil and a potential coil, means to couple said current coil between said point of relatively low potential and ground whereby a portion at least of the current in said impedance device is caused to flow through said current coil, an adjustable phase shifting network to which is applied at least a portion of the voltage between said point and ground, and a power amplifier coupled between said phase shifting network and said potential coil to provide the low voltage supply which is in phase with the high voltage when, by adjustment of said phase shifting network, the indication of said wattmeter has been caused to represent said power loss.

4. Apparatus for producing a low voltage supply in phase with an unknown high voltage, said apparatus comprising a capacitor of known defect angle connected to the high voltage, said capacitor having a tap to supply a relatively low potential related in phase to the high voltage, a phase sensitive device having first and second input circuits and being adapted to provide an indication which is dependent upon the phase difference between signals applied to said input circuits, a low voltage capacitor disposed in series with said first input circuit between said tap and ground, said capacitor having a value which is relatively large as compared with that of the portion of the high voltage capacitor between said tap and ground whereby most of the current in said high voltage capacitor is caused to flow through said first input circuit, an adjustable phase shifting network connected across said low voltage capacitor, and a power amplifier coupled between said phase shifting network and said second input circuit to provide the low voltage supply which is in phase with the high voltage when, by adjustment of said phase shifting network, the indication of said phase sensitive device has been caused to represent said defect angle.

5. In a high voltage electrical system including an impedance device of known defect angle connected to a high voltage line, the combination with said impedance device of apparatus for producing a low voltage supply having a given phase angle with reference to the high voltage, said apparatus comprising a phase sensitive device having first and second input circuits and being adapted to provide an indication which is dependent upon the phase difference between signals applied to said input circuits, means to couple said first input circuit between a point of relatively low potential on said impedance device and ground whereby a portion at least of the current in said impedance device is caused to flow through said first input circuit, an adjustable phase shifting network to which is applied at least a portion of the voltage between said point and ground, and a power amplifier coupled between said phase shifting network and said second input circuit to provide the low voltage supply having the given phase angle when by adjustment of said phase shifting network the indication of said phase sensitive device has been caused to represent the combination of said given phase angle and said defect angle.

References Cited in the file of this patent
UNITED STATES PATENTS

| | | |
|---|---|---|
| 1,617,912 | Kafka et al. | Feb. 15, 1927 |
| 1,898,828 | Green | Feb. 21, 1933 |
| 2,225,653 | Monk | Dec. 24, 1940 |
| 2,600,204 | Carleton | June 10, 1952 |
| 2,694,794 | Blomquist et al. | Nov. 16, 1954 |
| 2,771,581 | Stolzenbach | Nov. 20, 1956 |